United States Patent Office 3,000,866
Patented Sept. 19, 1961

3,000,866
COPOLYMERS OF ETHYLENE
Robert Edward Tarney, Wilmington, Del., assignor to E. I. du Pont de Nemours and Company, Wilmington, Del., a corporation of Delaware
No Drawing. Filed Oct. 26, 1959, Ser. No. 848,501
3 Claims. (Cl. 260—80.5)

This invention is directed to novel copolymers, and more particularly to ethylene copolymers which may be cured to form highly useful elastomers.

Alpha olefins such as ethylene and propylene are very important polymer intermediates today because they are commercially available in great volume at very low cost. It is known that they can be copolymerized to give products ranging in form from low molecular weight oils to high molecular weight solids.

Unfortunately, these copolymers are not convenient to cure. Unlike natural rubber, GRS, or butyl rubber, they contain essentially no ethylenic unsaturation which can be sulfur cured; thus, the curing procedures familiar to the trade cannot be used. Alternative methods for curing, such as the use of high energy radiation or the employment of organic peroxides, are more expensive and may limit the choice of antioxidants which can be incorporated in the uncured elastomer.

It is known that alpha olefin polymers containing hydrocarbon diene units can be sulfur cured. However, these copolymers have either required difficulty accessible dienes or they have been difficult to prepare in acceptable yields. Some of the dienes interfere with the alpha olefin polymerization by poisoning the catalyst or lowering its productivity. Many of the dienes are not copolymerized efficiently into the polymer. The unreacted diene monomer then presents recovery and recycling problems which are inconvenient and economically undesirable.

It is, therefore, an object of this invention to provide a new hydrocarbon elastomer. It is a further object to provide a new sulfur curable hydrocarbon elastomer. It is a still further object to provide a process for preparing these new elastomers and to provide a process for curing the same. These and other objects will appear hereinafter.

More specifically, the present invention is directed to a rubbery copolymer of ethylene, at least one alpha olefin having the structure $R-CH=CH_2$, where R is a $C_1-C_8$ alkyl radical, and dicyclopentadiene, with the proviso that there shall be at least about 20% ethylene units by weight and at least about 25% of said alpha-olefin units by weight and about 0.5% to 10% of dicyclopentadiene units by weight in said copolymer.

The novel copolymers of the present invention can be prepared by contacting ethylene, at least one of said alpha olefins, and dicyclopentadiene in solution in tetrachloroethylene with specific coordination catalysts, as hereinafter described, at temperatures between about 20° C. and 100° C., in the absence of oxygen and water vapor. The copolymers obtained as a result of this process are rubbery, high molecular weight elastomers capable of being sulfur-cured to form strong resilient elastomeric vulcanizates.

Representative copolymers of the present invention include: ethylene-propylene-dicyclopentadiene terpolymer, which is preferred, ethylene-1-butene-dicyclopentadiene terpolymer, ethylene-propylene - 1 - butene-dicyclopentadiene quaterpolymer, ethylene-1-octene-dicyclopentadiene terpolymer, ethylene-propylene - 1 - hexene-dicyclopentadiene quaterpolymer, ethylene - 1 - heptene-1-decene-dicyclopentadiene quaterpolymer, and, ethylene-5-methyl-1-heptene-dicyclopentadiene terpolymer. In order that these copolymers be elastomeric, they should contain least about 20% ethylene monomer units by weight, least about 25% $R-CH=CH_2$ monomer units (as described) by weight, and no more than about 10% dicyclopentadiene monomer units by weight. The ethylene monomer unit concentration ranges in general from about 20% to about 74.5% by weight. Copolymers having more ethylene monomer units tend to be stiff and not elastomeric. The concentration of $R-CH=CH_2$ monomer units ranges in general from about 25% to about 79.5% by weight. Copolymers having a higher propylene content are known to be leathery and boardy.

In order to provide a sufficient number of cross-link sites to obtain a good sulfur cure, at least about 0.5% dicyclopentadiene monomer units should be present by weight of the copolymer. Concentrations above 10% by weight cause the copolymer to stiffen and lose its desirable elasticity.

The coordination catalyst used in preparing the copolymers of this invention is made by mixing vanadium tetrachloride or vanadium oxytrichloride (also called vanadyl chloride) with a reducing compound having the structure $$(R)_3Al \text{ or } (R)_2AlX$$

where R is $C_1-C_{12}$ alkyl (such as ethyl, isobutyl, octyl or dodecyl) and X is a chlorine atom or a bromine atom; the preferred organoaluminum compound is aluminum triisobutyl. It has been found that the relative proportions of the vanadium salt and the organoaluminum compound may be varied so that the value of the molar ratio of aluminum to vanadium ranges between about 1:1 to 10:1. The amount of vanadium salt in the copolymerization reaction zone is about $5 \times 10^{-4}$ to $5 \times 10^{-3}$ mols/liter.

In a typical procedure a glass reaction vessel, equipped with a glass agitator, gas inlet and outlet tubes and openings to permit the introduction of liquid reagents, is charged under nitrogen with redistilled dicyclopentadiene and tetrachloroethylene which has been purified by distillation from calcium hydride or by passage through a column of silica gel. Agitation is started and a mixture of ethylene and propylene gases is continuously introduced through the gas-inlet tube below the liquid surface. The nitrogen inflow is discontinued. The relative amounts of ethylene and propylene in the gas feed stream are controlled by suitably calibrated rotameters which are placed in the gas feed lines ahead of the T in which the gases are mixed. Prior to their introduction into the reactor the gases are purified from oxygen, water vapor and other contaminants reactable with aluminum triisobutyl by passage through a scrubber containing aluminum triisobutyl. After the ethylene-propylene mixture has been introduced for 10 to 15 minutes, the tetrachloroethylene is substantially saturated with each monomer. Monomer inflow is continued and excess gas is allowed to escape through the gas outlet tube through a bubble-trap filled with Nujol to prevent back-flow of air. Aluminum triisobutyl and vanadium oxytrichloride are then added, in turn, to the tetrachloroethylene solution of ethylene, propylene and dicyclopentadiene by means of hypodermic needles through an opening in the reactor sealed with a soft rubber cap. The amount of vanadium oxytrichloride added is such that its concentration in the reaction mass is $5 \times 10^{-4}$ to $5 \times 10^{-3}$ mols/liter. Reaction occurs at once and an intense blue-violet color appears. The monomers are consumed and the temperature of the charge rises. Cooling may be applied, when desired. The concentration of copolymer reaches about 1 to 5 percent by weight in about 20 to 80 minutes when the temperature of the charge ranges between 20° and 60° C.; the higher the temperature, the shorter the time required. As the copolymerization proceeds, the charge becomes increasingly viscous; it is generally convenient to stop the reaction before the copolymer concentration exceeds about 5% by weight.

The catalyst is deactivated by introduction of a low molecular weight alcohol to the reaction mass; representative reagents are isopropanol and n-butanol. The copolymer solution is then extracted with 5% hydrochloric acid, washed with water until acid-free, and introduced onto a hot rotating drum; the tetrachloroethylene is flashed off, leaving a band of copolymer which is subsequently scraped from the drum by a doctor knife. An antioxidant, such as 2,2'-methylenebis(6-tert-butyl-4-methylphenol) or 4,4'-bis(6-tert-butyl-3-methyl-phenol)sulfide, is incorporated prior to the drum drying operation to avoid possible oxidation and degradation of the copolymer. The copolymerization process may be operated at atmospheric or superatmospheric pressure.

In operating the copolymerization process, all of the dicyclopentadiene may be present before the catalyst is added; alternatively, part or all of the dicyclopentadiene may be added during the copolymerization; this introduction may be continuous or periodic.

The novel copolymers of this invention are rubbery in nature and may be cured to form highly useful elastomers. Any one of a wide variety of curing procedures may be employed. In particular, the copolymers may be cured with sulfur by any of the procedures familiar to those skilled in the processing of natural rubber, butadiene-styrene rubber (SBR), and butyl rubber.

Various procedures and modifications of sulfur curing are described in Encyclopedia of Chemical Technology, Kirk and Orthmer, published by Interscience Encyclopedia, Inc., New York, 1953, vol. 11, pages 892–927; Principles of High-Polymer Theory and Practice, Schmidt and Marlies, published by McGraw-Hill Book Co., Inc., New York, 1948, pages 556–566; and Chemistry and Technology of Rubber, Davis and Blake, published by Reinhold Publishing Corporation, New York, 1937, vol. 74, chapter VI. Typical procedures are illustrated in the examples which follow.

In place of sulfur curing, which is preferred, one may employ a free radical cure.

In carrying out a free radical cure of the copolymers, it is merely necessary to mix, by standard procedures, a free radical generator with the copolymer and to heat until a cure is obtained. The temperature range may vary within wide limits, depending upon the particular free radical generator being used. However, heating to temperatures of about 50°–175° C. for a period of 30 minutes to several hours is ordinarily adequate. Longer times may be used in the case of the more thermally stable free radical generators.

The preferred free radical generators which may be incorporated with the copolymers are organic peroxides. Representative examples are bis(alpha,alpha-dimethylbenzyl) peroxide, dibenzoyl peroxide, di-tert-butyl peroxide, cumene hydroperoxide, methyl ethyl ketone peroxide, tert-butyl perbenzoate and di-N-methyl-tert-butyl percarbamate. Bis(alpha,alpha-dimethylbenzyl)-peroxide, often called dicumyl peroxide, is particularly preferred. About 2.5 to 3 parts by weight is used for every 100 parts by weight of the copolymer. The compounded stock is then cured at about 150° C. for about 30 to 60 minutes.

In addition to the free radical generator, a free radical acceptor may be present such as N-substituted maleimide, an N,N'-substituted bismaleimide, an N,N'-substituted bisacrylamide, a cyclic triacryloylhexahydrotriazine, or mixtures thereof. The quantity of free radical acceptor may range from about 0.5% to 6% by weight of the copolymer. The weight of the free radical acceptor may be less, equal to, or more than the weight of the free radical generator.

The maleimides are compounds having the formula:

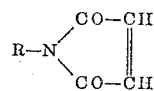

wherein R is an alkyl or an aryl radical. Representative maleimides include compounds such as N-methyl maleimide, N-phenyl maleimide and N-pyrenyl maleimide. The bismaleimides may be represented by the formula:

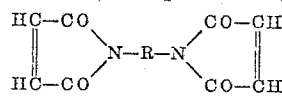

wherein R is an alkylene or an arylene radical. Representative bismaleimides include N,N'-ethylene bismaleimide, N,N'-phenylene bismaleimide and N,N'-pyrenylene bismaleimide. The bisacrylamides which may be used in the process of the present invention may be represented by the formula:

$$CH_2=CH-CO-NH-R-NH-CO-CH=CH_2$$

wherein R is an alkylene or an arylene radical. Representative compounds include methylene biscarylamide and phenylene bisacrylamide.

A wide variety of compounding agents may be incorporated with these copolymers at the time they are cured in order to improve various properties. Thus, they may be loaded with carbon black in order to increase the tensile strength. Other compounding agents include titanium dioxide and silica.

The copolymers of this invention have many varied uses. They may be employed in the preparation of tires, inner tubes, belts, hose and tubing, wire and cable jackets, footwear, sponges, coated fabrics, and a wide variety of coated or molded articles. They are characterized by good thermal stability and excellent resistance to ozone. The uncured but compounded copolymers are not affected by moisture but can be stored for lengthy periods before shaping and vulcanizing.

The following representative examples illustrate the novel composition of the present invention.

*Example 1*

A nitrogen blanket was used in all operations to avoid contamination by atmospheric oxygen and water vapor.

A 3-liter resin flask fitted with a glass paddle agitator, a thermometer, gas inlet and outlet tubes, and an opening to permit the introduction of liquid reagents, was charged under nitrogen at room temperature with 2 liters of silica gel purified nitrogen sparged tetrachloroethylene and 2.0 milliliters (0.015 mole) of redistilled dicyclopentadiene (B.P. 120–121° C. at 170 mm. Hg). Agitation was begun. A gaseous monomer mixture was then introduced through the gas inlet tube below the tetrachloroethylene liquid surface to supply ethylene and propylene at the respective rates of 200 and 1,600 cc./minute (molar proportions 1:8). The relative amounts of the monomers in this feed stream were controlled by suitably calibrated rotameters which were placed in the individual monomer feed lines ahead of the T in which the gases were mixed. Before it entered the reactor, the mixture passed through a 25 volume percent solution of aluminum triisobutyl in tetrachloroethylene. The tetrachloroethylene in the resin flask became saturated with ethylene and propylene. Excess gas was allowed to escape through the gas outlet tube into a bubble-trap filled with a hydrocarbon oil to prevent backflow of air into the reactor.

After the monomer gas mixture had been introduced for 30 minutes, nitrogen-flushed syringes were used to introduce, in turn, 0.90 milliliter (0.0035 mole) of aluminum triisobutyl and 20 milliliters (0.002 mole) of a 0.1 molar solution of vanadium tetrachloride (in tetrachlorounits by weight, and, about 0.5 to 10% of dicyclopentadiene units by weight in said copolymer.

2. The copolymer of claim 1 wherein the alpha olefin is propylene.

3. The copolymer of claim 1 wherein the alpha olefin is 1-butene.

References Cited in the file of this patent

UNITED STATES PATENTS

| | | |
|---|---|---|
| 2,699,457 | Ziegler et al. | Jan. 11, 1955 |
| 2,883,372 | Stamatoff | Apr. 21, 1959 |
| 2,910,458 | Goeing et al. | Oct. 27, 1959 |

Notice of Adverse Decision in Interference

In Interference No. 93,019 involving Patent No. 3,000,866, R. E. Tarney, Copolymers of ethylene, final judgment adverse to the patentee was rendered July 16, 1964, as to claims 1, 2 and 3.

[Official Gazette January 19, 1965.]

ethylene) into the resin flask. The reaction mixture turned a blue-violet color, monomer gases were absorbed rapidly, and the temperature rose to 40° C. Although the solution remained homogeneous and clear violet throughout the following 20 minutes, it became steadily more viscous.

The catalyst was then deactivated by adding several milliliters of n-butanol to the reaction mixture. Monomer gas inflow was stopped. After the reaction mixture had been acid washed (5% hydrochloric acid) and then washed acid-free with water, drum drying (40 lb. steam pressure, 2 revolutions per minute) gave 30.65 grams of a soft tacky attractive elastomer containing about 24.1% ethylene, 69.4% propylene, and 6.5% dicyclopentadiene by weight. Its infrared absorption exhibited a broad small peak at 690 cm.$^{-1}$ characteristic of a cis c=c group. It had an iodine number of 9.5.

25 grams of the above terpolymer was compounded on a rubber roll mill with 12.5 grams of super abrasion furnace black, 2.5 parts of "Nujol" oil, a liquid petrolatum of specific gravity 0.88/0.90 at 60° F. (available from Plough, Inc., Memphis, Tenn.), 0.3 gram of N,2-dinitroso-N-methylaniline, 1.25 grams of zinc oxide, 0.25 gram of stearic acid, 0.188 gram of tetramethylthiuramdisulfide, 0.375 gram of tellurium diethyldithiocarbamate, and 0.375 gram of sulfur. The stock obtained was cured at 150° C. for 1 hour to give an elastomeric vulcanizate displaying the following properties at 25° C.: modulus at 200% extension, 1,100 lb./sq. in., tensile strength at the break, 1,700 lb./sq. in., and extension at the break, 300%.

*Example 2*

In accordance with the procedure given in Example 1, an agitated solution of 1.0 milliliter (0.0075 mole) of dicyclopentadiene in one liter of tetrachloroethylene was saturated by a monomer gas stream supplying ethylene and propylene at the respective rates of 600 and 1500 cc./minute (molar proportions 1:2.5). Addition of 0.60 milliliter (0.0024 mole) of aluminum triisobutyl and 0.11 milliliter (0.001 mole) of vanadium oxytrichloride to the monomer solution caused it to become blue-violet; monomer gases were absorbed rapidly and the temperature of the reaction mixture rose to 38° C. After 30 minutes, butyl alcohol was introduced to deactivate the catalyst. After the reaction mixture had been worked up according to the procedure described in Example 1, 18.0 grams of an extremely tough elastomer was isolated containing about 61.3% ethylene, 33.3% propylene, and 5.4% dicyclopentadiene by weight. The infrared absorption spectrum exhibited absorption typical of a c=c group at 6.1 microns.

A 10.0 gram sample of elastomer was compounded on a hot rubber roll mill according to the procedure of Example 1 and cured at 160° C. for 1 hour. The vulanizate obtained exhibited the following properties at 25° C.: modulus at 300% extension, 1,900 lb./sq. in.; tensile strength at the break, 2,600 lb./sq. in.; extension at the break, 400%.

*Example 3*

A 2-liter cylindrical glass resin flask was employed which was fitted with a stainless steel 2-bladed agitator, gas inlet and outlet tubes, a thermometer, and openings to permit the introduction of liquid reagents. The remaining equipment was similar to that described in Example 1.

2.0 milliliters of dicyclopentadiene and 1000 milliliters of tetrachloroethylene were introduced into the agitated resin flask at room temperature. A gaseous monomer mixture was then introduced through the gas inlet tube below the tetrachloroethylene surface to supply ethylene and 1-butane at the rate of 750 cc./min. each (molar proportions 1:1). After 10 minutes the flow rate of each monomer was increased to 2000 cc./minute.

Then, 4.0 milliliters (0.002 mole) of 0.5 molar aluminum triisobutyl solution (in tetrachloroethylene) and 3.0 milliliters (0.0015 mole) of 0.5 molar vanadium oxytrichloride solution (in tetrachloroethylene) were introduced, in turn, into the tetrachloroethylene solution. Heat was evolved and rapid monomer gas absorption occurred. In 14 minutes the temperature rose from 28° C. to 52° C.; for the next 16 minutes the temperature remained essentially constant. The catalyst was then deactivated and the reaction mixture was treated according to the procedure of Example 1 to give 20 grams of elastomer containing about 55–60% ethylene, 35–30% 1-butene, and 9–10% dicyclopentadiene.

The rubbery terpolymer was compounded according to the following recipe:

| Component: | Parts by weight |
|---|---|
| Terpolymer | 100 |
| Superabrasion furnace black | 50 |
| N,2-dinitroso-N-methylaniline | 1.2 |
| 4,4'-bis(2-tert-butyl phenol)sulfide | 0.2 |
| Zinc oxide | 5.0 |
| Stearic acid | 1.0 |
| Tetramethylthiuramdisulfide | 0.75 |
| Tellurium diethyldithiocarbamate | 1.5 |
| Sulfur | 1.0 |

The vulcanizate obtained displayed the following properties at 25° C.: tensile strength at the break 2,600 lb./sq. in.; extension at the break 235%.

*Example 4*

The general procedure given in Example 1 was followed. An ethylene-propylene gas mixture (molar proportions of ethylene:propylene 1:3.3) was introduced for 30 minutes at the rate of 2,200 cc./min. into an agitated solution of 0.5 milliliter (0.00375 mole) of dicyclopentadiene in 2 liters of tetrachloroethylene at room temperature. While monomer gas inflow was continued, 0.90 milliliter (0.0038 mole) of aluminum triisobutyl and 0.25 milliliter (0.002 mole) of vanadium oxytrichloride were introduced, in turn, into the agitated monomer solution, causing the latter to turn blue-violet; the temperature rose to 41° C. and gas was absorbed at a rapid rate. After 20 minutes, .5 milliliters of n-butanol was added to the viscous solution to deactivate the catalyst. Monomer gas inflow was stopped. The reaction mixture was extracted with 5% hydrochloric acid and thereafter washed acid-free with water. Drum drying gave 21.2 grams of a non-tacky elastomer containing about 40.7% ethylene, 57% propylene, and 2.3% dicyclopentadiene by weight. It exhibited an iodine number of 13.3.

The terpolymer was compounded with 45 parts per hundred by weight of super abrasion furnace black; after the stock had been further compounded by the procedure disclosed in Example 1, it was cured at 150° C. for 1 hour. The vulcanizate exhibited at 25° C.: modulus at 300%, extension of 750 lb./sq. in., tensile strength at the break 1,300 lb./sq. in., and extension at the break 480%.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A rubbery copolymer of ethylene consisting of ethylene, at least one alpha olefin having the structure R—CH=CH$_2$, in which alpha olefin R is a C$_1$–C$_8$ alkyl radical, and dicyclopentadiene, there being at least about 20% to about 74.5% ethylene units by weight and at least about 25% to about 79.5% of said alpha olefin